United States Patent [19]

Lee

[11] Patent Number: 5,160,186

[45] Date of Patent: *Nov. 3, 1992

[54] LOW PROFILE WEB ADJUSTER

[75] Inventor: David J. Lee, Carmel, Ind.

[73] Assignee: Indiana Mills and Manufacturing Inc., Westfield, Ind.

[*] Notice: The portion of the term of this patent subsequent to Jul. 16, 2008 has been disclaimed.

[21] Appl. No.: 635,715

[22] Filed: Dec. 28, 1990

Related U.S. Application Data

[63] Continuation-in-part of Ser. No. 499,946, Mar. 27, 1990, Pat. No. 5,031,962.

[51] Int. Cl.⁵ .................................... A47D 15/00
[52] U.S. Cl. ............................ 297/479; 297/476; 297/484
[58] Field of Search ............... 297/476, 479, 484, 478, 297/480; 24/170, 191, 188; 280/801-808

[56] References Cited

U.S. PATENT DOCUMENTS

| | | |
|---|---|---|
| D. 296,678 | 7/1988 | Lortz et al. ............. D11/216 |
| D. 303,232 | 9/1989 | Lortz et al. ............. D11/216 |
| 3,078,986 | 2/1963 | Ushkow ................... 206/56 |
| 3,109,253 | 11/1963 | Eig ............................. 42/1 |
| 3,434,186 | 3/1969 | Rennert ..................... 24/191 |
| 3,761,127 | 9/1973 | Giese et al. ............ 297/475 X |
| 3,872,550 | 3/1975 | Yang ........................ 221/170 |
| 4,660,889 | 4/1987 | Anthony et al. .......... 297/467 |
| 4,679,852 | 7/1987 | Anthony et al. .......... 297/464 |
| 4,682,791 | 7/1987 | Ernst ..................... 280/808 X |
| 5,031,962 | 7/1991 | Lee ........................... 297/479 |

Primary Examiner—Kenneth J. Dorner
Assistant Examiner—Milton Nelson, Jr.
Attorney, Agent, or Firm—Woodard, Emhardt, Naughton, Moriarty & McNett

[57] ABSTRACT

A low profile web adjuster for securing a web. A seat includes a harness, one end of which extends through a web adjuster mounted to the seat. A pivot cam on the adjuster is operable to lockingly engage one end of the harness. In the preferred embodiment, the cam is moved by pulling a control member having a pair of arms pivotally mounted to the cam member at a location to force the cam member apart from the web. Under normal loading, the cam member contacts and holds the web against the base wall of the adjuster and under high loading also holds the web against an upraised rib on the base wall.

10 Claims, 5 Drawing Sheets

LOW PROFILE WEB ADJUSTER

CROSS-REFERENCE TO RELATED APPLICATION

This application is a continuation-in-part of the commonly owned U.S. patent application Ser. No. 499,946 filed Mar. 27, 1990 (U.S. Pat. No. 5,031,962, Jul. 16, 1991) and entitled LOW PROFILE WEB ADJUSTER.

BACKGROUND OF THE INVENTION

1. Field of the Invention

This invention is in the field of fasteners for securing webs and belts.

2. Description of the Prior Art

Recently enacted laws require seats within automobiles for restraining a child or infant. Typically, the seats include a harness which is releasably securable around the child with the harness passing over the shoulders and having a front end releasably locked to a buckle or similar fastening device. Such a seat with harness is shown in U.S. Pat. No. 4,660,889 issued to Indiana Mills & Manufacturing, Inc. The harness passing over the child's shoulders and through the seat has an opposite end frictionally engaged by a web adjuster mounted to the seat. The web adjuster has a pivotally mounted cam member which may be released to facilitate sizing of the harness relative to the child. Such web adjusters are also shown in U.S. Pat. Nos. Des. 296,678 and 303,232 assigned to Indiana Mills & Manufacturing, Inc. Other web adjusters incorporating pivotally mounted cams with gripping surfaces for holding webs are shown in the U.S. Pat. Nos. 3,434,186 issued to Rennert and 3,872,550 issued to Yang.

The aforementioned web adjusters include an outwardly extending handle allowing the user to pivot the cam member for releasing the web relative to the adjuster. In U.S. Pat. No. 4,679,852 assigned to Indiana Mills & Manufacturing, Inc. a rotatable rod mounted to the child's seat extends through the web adjuster handle to allow the user to rotate the rod and thereby pivot the web adjuster handle. A similar seat with adjuster is shown in the common owned U.S. Pat. No. 4,679,852. I have provided a web adjuster having a more compact means for operating the pivotally mounted cam member of the web adjuster. Disclosed herein is such a web adjuster having alternate designs. In one design, the cam member may be pushed for pivoting the cam member whereas in an alternate design, the control means may be pulled for pivoting and thereby releasing the cam member.

SUMMARY OF THE INVENTION

One embodiment of the present invention includes a child restraining device for mounting in a vehicle comprising a child support upon which the child may be supported and a harness movably mounted to the support and including a restraining portion positionable against the child with a first lock thereon. The harness including a web affixed thereto being located beneath the support with the web extending forwardly through the support. A second lock is mounted to the support and engageable with the first lock to secure the harness to the support. A web adjuster is mounted to the support with the adjuster including a cam frictionally receiving the web being operable to hold the web once the web is pulled manually through the adjuster to tighten the harness and also being operable to release the web to loosen the harness upon manual operation of the adjuster. The adjuster including a frame with a base and a rib formed thereon and including a pair of upstanding walls secured thereto with the cam including a pivot axis and having a cam member pivotally mounted to the walls. The cam member is normally located in a web engageable position holding the web against the base but movable to a release position allowing the web to move relative to the frame. The cam is further operable to allow the cam member to move to an increased gripping position whereat the cam member holds the web against the rib. The adjuster further including a control engaged with the cam member operable to move the friction surface from the web engageable position to the release position.

A further embodiment of the present invention includes a device for adjusting a web comprising a frame including a wall with an upraised portion and a pair of upstanding walls secured thereto. A web is extendable along the wall and a mounting pin is mounted to and extends between the upstanding walls being spaced from the wall. A cam member having a pivot axis is pivotally mounted by the pin to the frame and includes a web engaging rough surface. A spring including one end engaged with the pin and an opposite end engaged with the cam member normally urges the cam member to pivot moving the rough surface against the web holding the web against the wall but is yieldable allowing the cam member to be pivoted moving the rough surface away from the wall to allow the web to be moved. The cam member pivoting further holding the web against the upraised portion under abnormal high loading on the web. A control is engaged with the cam member operable to move the rough surface from the web allowing the web to be moved relative to the wall.

It is an object of the present invention to provide a new and improved web adjuster.

A further object of the present invention is to provide a web adjuster having a low profile.

Yet another object of the present invention is to provide a low profile web adjuster.

An additional object of the present application is to provide a web adjuster which will increase the web holding force during abnormal high loading.

Related objects and advantages of the present invention will be apparent from the following description.

DESCRIPTION OF THE PREFERRED EMBODIMENTS

Figure 1:
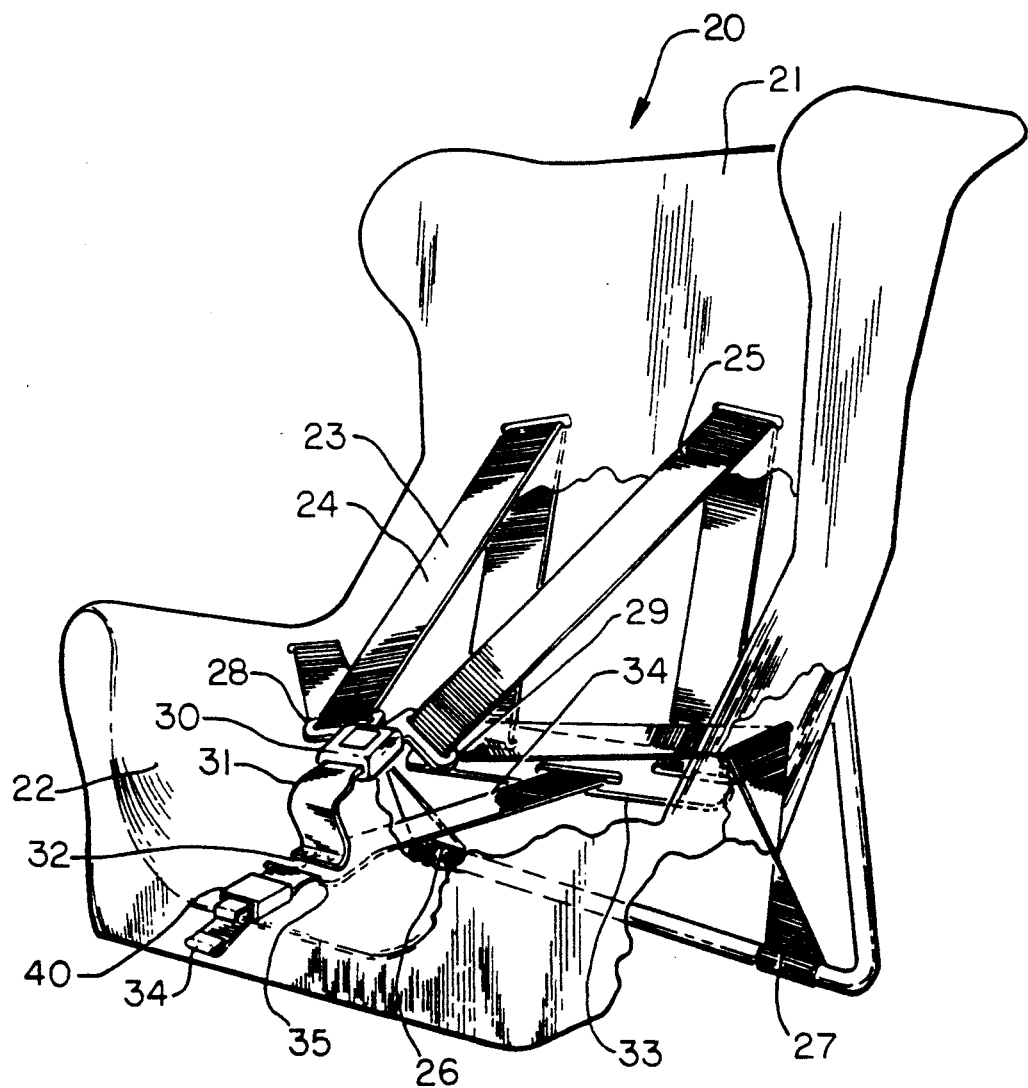
FIG. 1 is a perspective fragmentary view of a seat having the adjuster incorporating the present invention.
Figure 2:
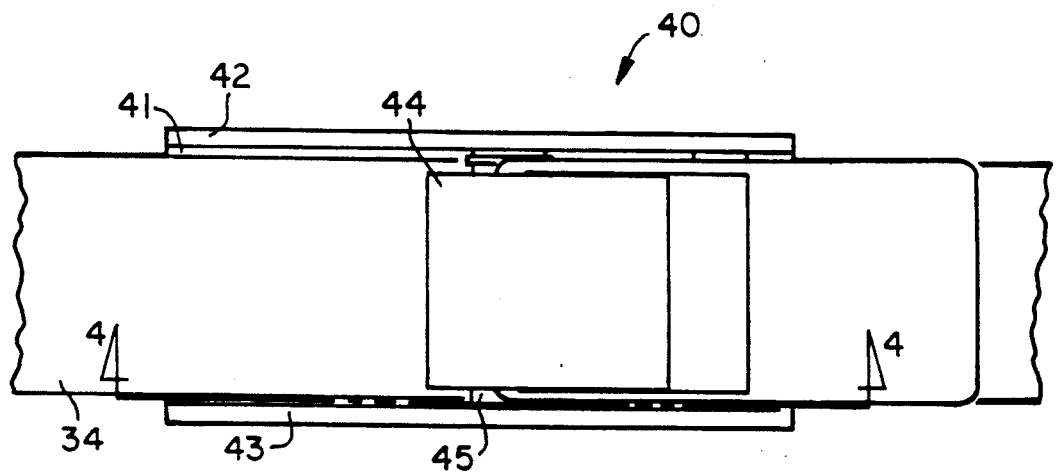
FIG. 2 is an enlarged top view of an alternative embodiment of the web adjuster mounted to the seat of FIG. 1 with the outer housing removed.
Figure 3:
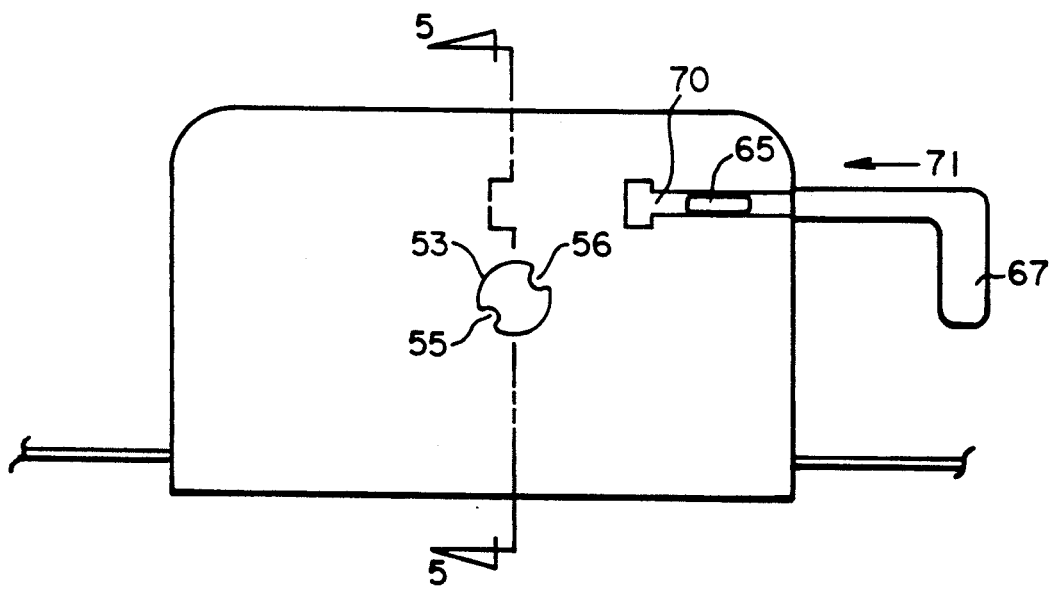
FIG. 3 is a side view of the adjuster of FIG. 2.
Figure 4:
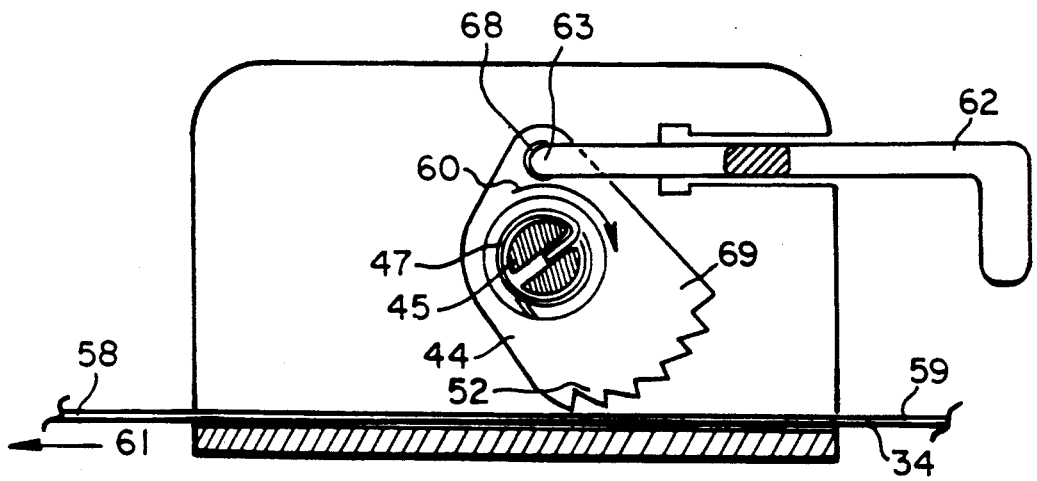
FIG. 4 is a cross-sectional view taken along the line 4—4 of FIG. 2 and viewed in the direction of the arrows.
Figure 5:
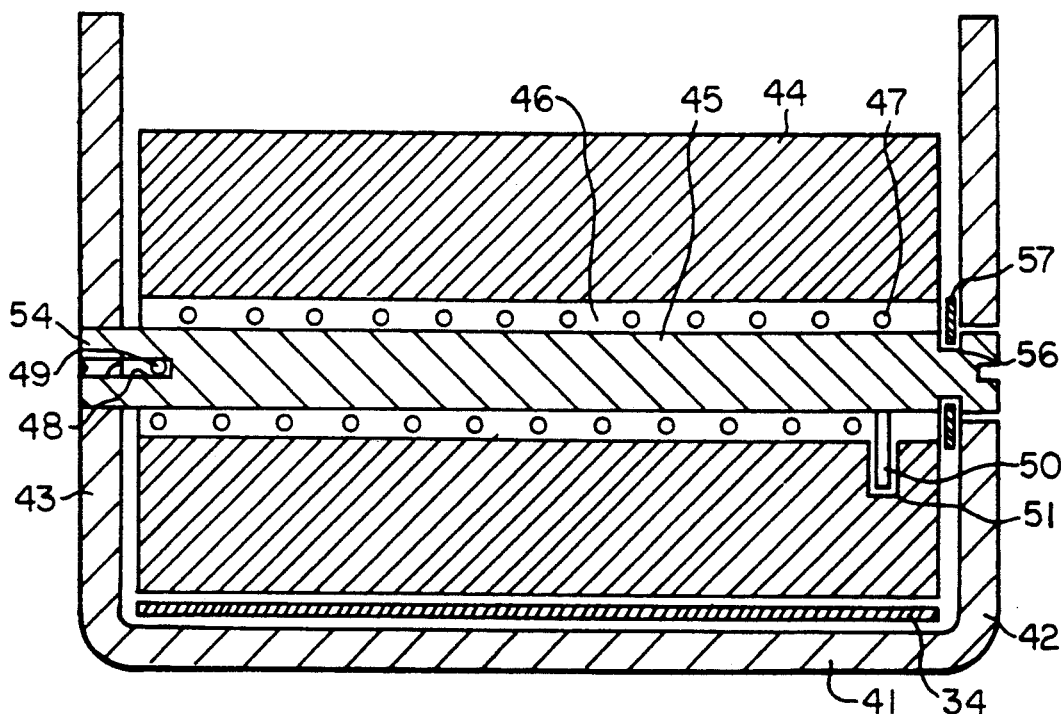
FIG. 5 is an enlarged cross-sectional view taken along the line 5—5 of FIG. 3 and viewed in the direction of the arrows.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a seat 20 having a back portion 21 and seat portion 22 integrally connected together. A harness 23 is mounted to the seat and is designed to adjust to the size of the child placed on the seat. A variety of different types of harnesses may be installed onto the seat. In FIG. 1, a 5 point harness is depicted. As such, harness 23 includes two webs 24 and 25 having respectively first ends 26 and 27 fixedly fastened to the seat with both webs slidably extending respectively through a pair of conventional separate tongues 28 and 29 releasably lockable to a conventional seat belt buckle 30. Buckle 30 is secured to strap 31 having a strap end 32 fixedly secured to the seat. Webs 24 and 25 extend slidably through slots provided in back portion 21 of the seat with the webs then extending rearwardly of the seat being fastened to a bar 33. The bar is also fastened to a third web 34 extending forwardly through a slot 35 formed in seat portion 22. Web 34 then extends releasably through a web adjuster 40 fastened to the seat. Operation of the web adjuster allows web 34 to be loosened or tightened which in turn results in the loosening or tightening of harness 23.

Many variations are contemplated and included in the present invention. For example, the web adjuster is shown in combination with a 5 point harness although the web adjuster will work equally well with other types of harnesses so long as the web adjuster is operable to loosen or tighten the harness.

Figure 6:
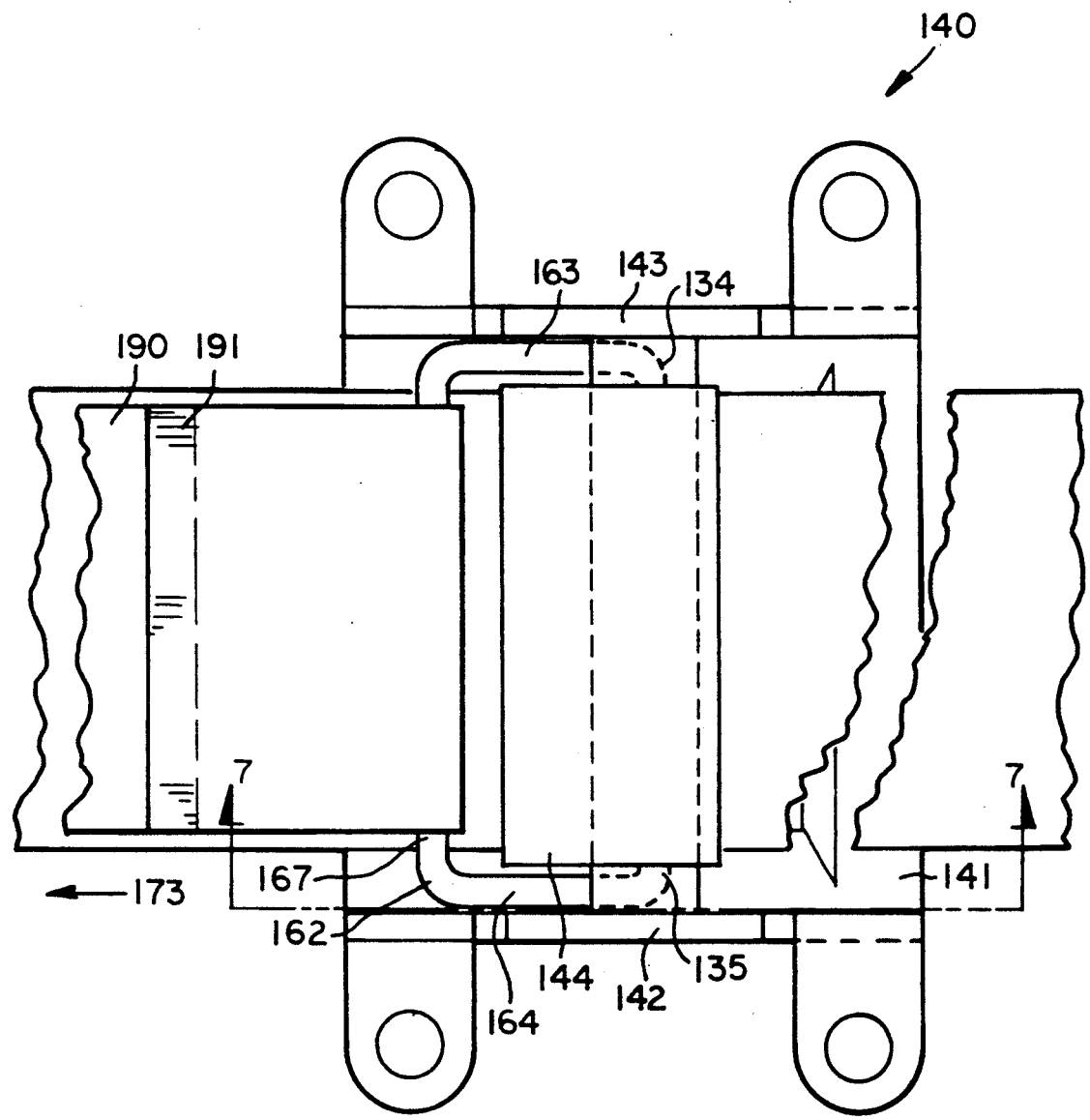
FIG. 6 is the same view as FIG. 2 only showing the preferred embodiment.
Figure 7:
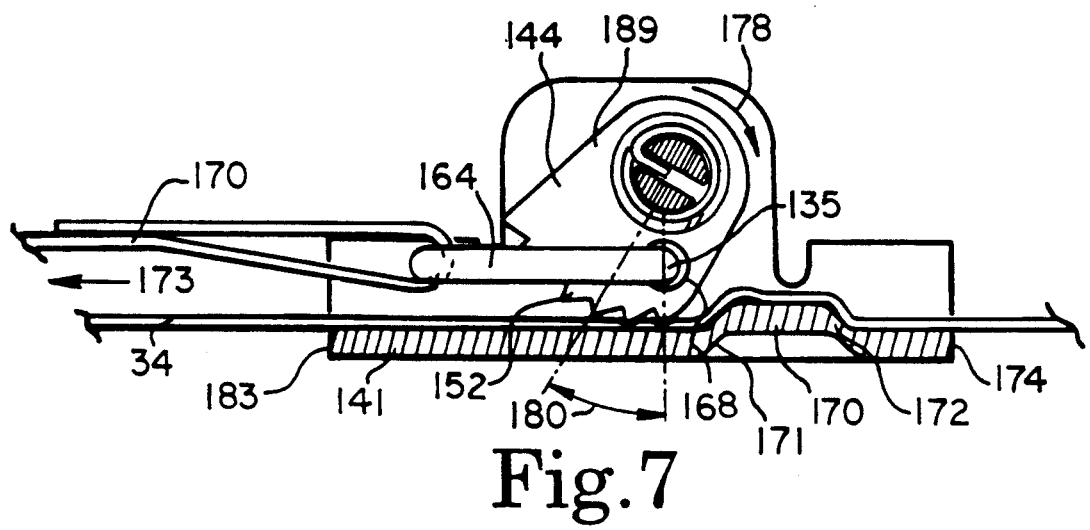
FIG. 7 is a cross sectional view taken along the line 7—7 of FIG. 6 and viewed in the direction of the arrows showing the adjuster in the locked position under normal loads.
Figure 8:
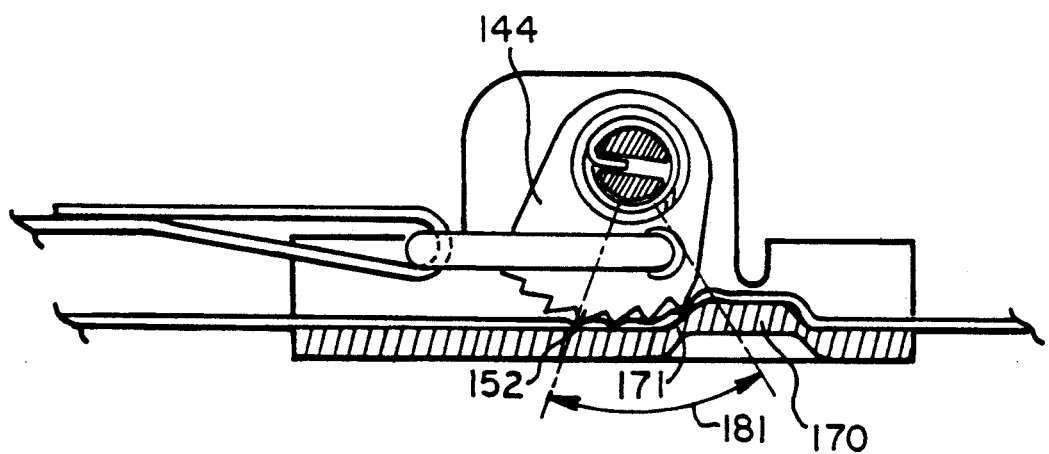
FIG. 8 is the same view as FIG. 7 only showing the adjuster in the locked position under abnormal high loads.

The alternate embodiment of the web adjuster is shown in FIG. 2 through FIG. 5 with the preferred embodiment of the adjuster being shown in FIG. 6 through FIG. 8. Web adjuster 40 includes an outer housing enclosing a U-shaped metal frame having a base wall 41 integrally jointed to a pair of upstanding walls 42 and 43. The web adjuster housing shown in FIG. 1 has been removed from the remaining figures to depict the inner construction. Base wall 41 is fixedly fastened by rivets or other suitable fastening means to the seat portion 22 of the seat so that the base wall extends generally horizontal. Pivotally mounted by pin 45 to and between walls 42 and 43 is a cam member 44. Cam member 44 (FIG. 5) includes a through hole 46 within which is positioned a helical spring 47 and pin 45. The pin extends centrally through the helical spring and has a slot 48 at one end to receive one end 49 of the spring with the opposite end 50 of the spring extending into a hole 51 provided in the cam member. The helical spring is installed with the opposite ends in slot 48 and hole 51 so that the plurality of friction ridges 52 (FIG. 4) provided on the outer surface of the cam member are forced against web 34 trapping the web between the cam member and base wall 41.

Wall 43 includes an aperture 53 (FIG. 3) through which end 54 of the pin extends. Aperture 53 is restricted forming a pair of inwardly projecting teats 55 and 56 which extend into slot 48 preventing rotational movement of the pin. The opposite end of the pin includes a groove 56 (FIG. 5) located immediately inward of wall 42 when the pin is installed to the adjuster. A conventional C-shaped clamp 57 is mounted within the groove preventing the pin from disengaging walls 42 and 43.

End portion 58 (FIG. 4) of web 34 extends through a slot 35 (FIG. 1) formed in seat support 22 and is attached by means of bar 33 to the harness. The free end 59 of the web extends through a hole in the web adjuster housing and lies against the forward portion of the seat. The spring is operable to normally force cam member 44 in the clockwise direction indicated by arrow 60 (FIG. 4) thereby causing the friction engaging surface of the cam formed by teeth 52 to engage web 34 preventing movement of the web in the web release direction of arrow 61. At the same time, the web may be grasped by end 59 and pulled in a direction opposite of arrow 61 to tighten the harness. In order to release the harness, a push control 62 is slidably mounted to and between the upstanding walls of the frame and when pushed will rotate cam member 44 in a counter clockwise direction as viewed in FIG. 4 thereby moving teeth 52 apart from web 34 and allowing movement of the web in the direction of arrow 61 thereby loosening the harness.

Push control 62 (FIG. 3) includes a pair of inwardly turned and opposed distal ends extending into holes provided on the opposite ends of the cam member above the pivot axis. For example, end 63 extends into hole 68 (FIG. 4) provided on end 69 of the cam member. A pair of projections provided on the opposite edges of push control 62 extend slidably respectively into slots provided on upstanding walls 43 and 42. For example, projection 65 (FIG. 3) is slidably mounted within slot 70 in upstanding wall 43. The push control includes a depending wall 67 allowing the user to push the control in the direction of arrow 71 (FIG. 3) thereby pivoting the cam member in a counter clockwise direction as viewed in FIG. 4 releasing the cam member from the web.

The preferred embodiment of the web adjuster is shown in FIG. 6 through FIG. 8. Web adjuster 140 includes a frame having a pair of upstanding walls 142 and 143 integrally joined to a base wall 141 which extends generally horizontal and is affixed to the horizontal seat portion of the seat. A cam member 144 is pivotally mounted to walls 142 and 143. In lieu of utilizing push control 62, web adjuster 140 has a pull control 162 (FIG. 6). Pull control 162 has a pair of arms 163 and 164 having inwardly turned distal ends 134 and 135 projecting into holes provided on the opposite outwardly facing ends of cam 144. For example, arm 164 has an inwardly turned distal end 135 projecting into hole 168 (FIG. 7) provided on end 189 of the cam element. A rod 167 is integrally joined to and between arms 164 and 163 with a fabric tab 190 extending around rod 167. One end 191 of tab 190 is secured by stitching or other suitable means to the main body of the tab with the opposite end of the tab extending freely away from the web adjuster. Thus, tab 190 may be pulled in the direction of arrow 173 thereby causing clockwise rotation 178 of cam 144 as viewed in FIG. 7 forcing the friction teeth 152 to disengage web 34 allowing the web to be moved in the direction opposite of arrow 173 thereby loosening the harness. Release of tab 190 allows the helical spring to rotate the cam in a counter clockwise direction as viewed in FIG. 7 thereby engaging web 34 and preventing further loosening of the harness. Web 34 may be moved in the direction of arrow 173 to tighten the harness even though teeth 152 are engaged with the web. Notably, fabric strap 190 may be moved in the direction of arrow 173 which is the same direction that web 34 is moved when tightening the harness.

FIG. 7 illustrates the adjuster in the locked position under normal loads. The bottom wall 141 of the bracket includes an upraised rib 170 located between the pivot axis of cam member 144 and the aft end 174 of the bracket. Rib 170 is integral with bottom wall 141 and is joined thereto by means of an upwardly sloping front wall 171 and an upwardly sloping back wall 172. The rib extends across the width of wall 141 between upraised walls 142 and 143 and has opposite ends terminating inwardly of the upstanding walls 142 and 143. Thus, the base wall 141 is flat between the upstanding walls and the opposite ends of the rib. In one embodiment, the rib terminated approximately ¼ inch inwardly of upstanding walls 142 and 143. Under normal loading, teeth 152 engage belt 134 and force the belt against the upwardly facing surface of bottom wall 141 at a location between the front end 183 of the bracket and the upwardly sloping wall 171 of rib 170. The upwardly facing flat surface of wall 141 is located further from the pivot axis of cam 144 than the upwardly facing surface of wall 171. The distance from the teeth 152 to the pivot axis of the cam is such that the cam member under normal loading positions teeth 152 atop the upwardly facing surface of wall 141 apart from the upwardly facing surface of wall 171. That is, under normal locked conditions, the teeth of the cam are not located adjacent wall 171 and thus the belt is not lockingly forced thereagainst. On the other hand, under abnormal high loading such as experienced in a crash or under emergency conditions, the passenger is forced against belt 34 thereby pulling the belt in the direction opposite of arrow 173 forcing the cam to pivot further in a counterclockwise direction as viewed in FIG. 7 thereby forcing the teeth atop the upwardly facing surface of wall 171 holding the belt between wall 171 and the cam member. To unlock the adjuster, tab 190 is then pulled in the direction of arrow 173.

FIG. 8 illustrates the adjuster in the locked position under abnormal high loads. Such loads occur in a crash or other emergency situation whereby cam member 144 pivots an additional amount in the counterclockwise direction as viewed from FIG. 7-FIG. 8 thereby positioning teeth 152 against the upwardly facing surface of wall 171 of rib 170. Belt 34 is thereby forced against and locked to rib 170. Teeth 152 while forcing the belt against wall 171 also force the belt against the upwardly facing flat surface of wall 141 immediately in front of wall 171 thereby not only increasing the area of contact between the belt, teeth and wall but also most importantly increasing the angle of contact around the pivot axis of cam 144 existing between the belt, teeth, wall 141 and rib 172. For example, the angle 180 (FIG. 7) of contact around the cam pivot axis between the belt, teeth and wall 141 increases to angle 181 (FIG. 8) under high loading with teeth 152 forcing the belt against wall 141 and wall 171. In addition to providing additional locking of the belt, the rib is operable to prevent the bottom wall from bowing under extreme loads. Without such a rib, the bottom wall bows under high loading thereby forcing the wall apart from the teeth and belt considerably reducing the locking ability of the adjuster. The rib is particularly advantageous in that the area of contact between the belt, rib and bottom wall is across substantially the entire width of the adjuster thereby preventing the belt from cocking or wiggling loose.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:
1. A low profile web adjuster comprising:
a frame including a base wall with a rib formed on said base and projecting outwardly therefrom, said frame further including a pair of upstanding walls extending from said base wall with said rib extending between said upstanding wall;
a mounting device mounted to and extending between said upstanding walls, said mounting device spaced apart from said base wall;
a cam member having a pivot axis and pivotally mounted by said mounting device to said upstanding walls on said pivot axis, said cam member including a web engageable friction surface movable toward said base wall and said rib to hold a web therebetween, said rib positioned between said base wall and said pivot axis;
spring means engaged with said cam member normally forcing said friction surface to a web engageable position under normal loading to hold a web between said cam member and said base wall but yieldable to allow said cam member to pivot moving said friction surface away from said web engageable position to a release position allowing said web to move relative to said frame and said cam member, said spring means further operable to allow said cam member under abnormal high loading to further pivot moving said friction surface adjacent said rib to hold said web between said cam member and said rib;
control means associated with said cam member to move said cam member and said friction surface from said web allowing said web to be be moved relative to said frame.
2. A low profile web adjuster comprising:
a frame including a base wall with an upwardly extending rib formed thereon and a pair of upstanding walls extending therefrom, said base wall having a first surface and with said rib having a second surface located apart from said first surface;
a mounting device mounted to and extending between said upstanding walls, said mounting device being spaced apart from said base wall;
a cam member having a pivot axis and being pivotally mounted by said mounting device to said upstanding walls on said pivot axis, said cam member including a web engageable friction surface movable toward said base wall and said rib to hold a web therebetween, said first surface located further from said pivot axis than said second surface is from said pivot axis;

spring means engaged with said cam member normally forcing said friction surface to a web engageable position under normal loading to hold a web between said cam member and said first surface of said base wall but yieldable to allow said cam member to pivot moving said friction surface away from said web engageable position to a release position allowing said web to move relative to said frame and said cam member, said spring means further operable to allow said cam member under abnormal high loading to further pivot moving said friction surface adjacent said rib to hold said web between said cam member and said second surface of said rib;

control means engaged with said cam member operable to move said friction surface from said web engageable position to said release position; and, said control means includes at least one arm pivotally engaged with said cam member at a location spaced apart from said pivot axis to pivot said cam member as said control means moves.

3. The adjuster of claim 2 wherein:

said friction surface when in said web engageable position allows said web to move in a tightening direction but limits movement of said web in a release direction which is in a direction opposite of said tightening direction.

4. The adjuster of claim 3 wherein:

said control means includes a pair of arms and a main body with said arms thereon, said main body includes a fabric strap secured thereto allowing said control means to be pulled moving said cam member to said release position with said spring means operable to return said cam member to said web engageable position.

5. A child restraining device for mounting in a vehicle comprising:

a child support upon which the child may be supported;

a harness movably mounted to said child support and including a restraining portion positionable against the child with first lock means thereon, said harness including a web affixed thereto being located beneath said support with said web extending forwardly through said support;

second lock means mounted to said support and engageable with said first lock means to secure said harness to said support; and a web adjuster mounted to said support, said adjuster including cam means to frictionally receive said web, said cam means operable to hold said web once said web is pulled manually through said adjuster to tighten said harness and also operable to release said web to loosen said harness upon manual operation of said adjuster, said adjuster including a frame with a base and a rib formed thereon and including a pair of upstanding walls secured thereto with said cam means including a pivot axis, said cam means having a cam member pivotally mounted to said walls, said cam member normally located in a web engageable position holding said web against said base but movable to a release position allowing said web to move relative to said frame, said cam means further operable to allow said cam member to move to an increased gripping position whereat said cam member holds said web against said rib, said adjuster further including control means associated with said cam member operable to move said friction surface from said web engageable position to said release position; and wherein; said cam member when in said web engageable position allows said web to move in a tightening direction but limits movement of said web in a release direction; said cam member is pullable in the direction of said tightening direction to move said cam member to said release position and allow said web to be moved in said release direction.

6. A device for adjusting a web to restrain a child comprising:

a child support upon which a child may be supported;

a frame mounted to said child support including a wall with an upraised portion and a pair of upstanding walls secured thereto;

a web movably mounted to said child support and including a restraining portion positionable against the child, said web extendable along said wall;

mounting means on said upstanding walls and being spaced from said wall;

a cam member having a pivot axis and being pivotally mounted by said mounting means to said frame and including a web engaging rough surface;

spring means engaged with said cam member normally urging said cam member to pivot moving said rough surface against said web holding said web against said wall but being yieldable allowing said cam member to be pivoted moving said rough surface away from said wall to allow said web to be moved, said cam member pivoting further holding said web against said upraised portion under abnormal high loading on said web; and, control means associated with said cam member to move said cam member and said rough surface from said web allowing said web to be moved relative to said wall.

7. The adjuster of claim 6 wherein:

said cam member normally holding said web against said frame through a first angle of contact while under said abnormal high loading holding said web against said frame through a second angle of contact greater than said first angle increasing the holding thereof.

8. The adjuster of claim 6 and further comprising:

said control means includes a pair of spaced apart arms pivotally engaged with said cam member at a location spaced apart from said pivot axis to pivot said cam member as said control means moves.

9. The adjuster of claim 8 wherein:

said rough surface when engaged with said web allows said web to move in a tightening direction but limits movement of said web in a release direction which is in a direction opposite of said tightening direction.

10. The adjuster of claim 9 wherein:

said control means is pullable in the direction of said tightening direction to move said cam member and allow said web to be moved in said release direction.

* * * * *